(No Model.)

A. R. PRITCHARD.
TEA STRAINER.

No. 555,736.                 Patented Mar. 3, 1896.

Witnesses.
C. H. Marsellus.
S. P. Moon

Inventor.
Albert R. Pritchard
by
Howard L. Osgood
Attorney.

UNITED STATES PATENT OFFICE.

ALBERT R. PRITCHARD, OF ROCHESTER, NEW YORK.

TEA-STRAINER.

SPECIFICATION forming part of Letters Patent No. 555,736, dated March 3, 1896.

Application filed December 23, 1895. Serial No. 573,123. (No model.)

*To all whom it may concern:*

Be it known that I, ALBERT R. PRITCHARD, a citizen of the United States, and a resident of the city of Rochester, in the county of Monroe and State of New York, have invented a certain new and useful Improvement in Tea-Strainers, of which the following is a specification, reference being had to the accompanying drawings, in which—

Figure 1:
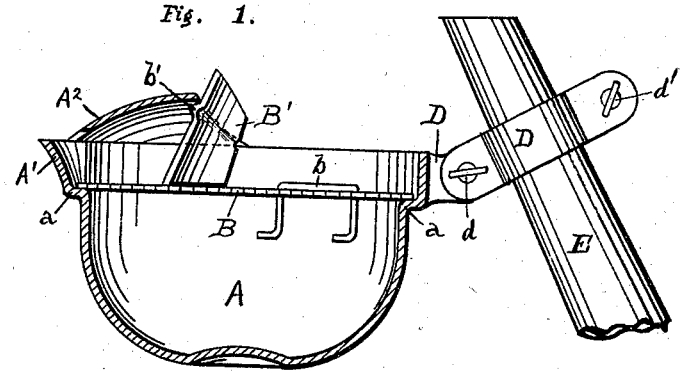
Figure 2:
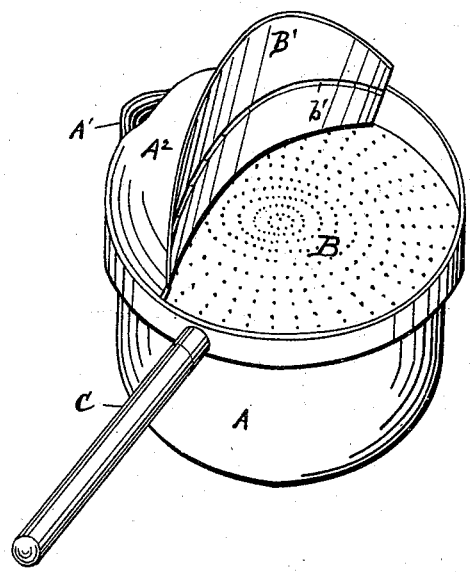

Figure 1 is a vertical section of one of my strainers, showing the same attached to the spout of a teapot; and Fig. 2 is a perspective view of one of my strainers, showing the same with an ordinary handle.

The object of my invention is to provide an efficient and dripless tea-strainer; and my invention consists in the construction and arrangement of parts hereinafter described and claimed.

In the drawings, A is a small vessel of suitable shape, provided with a spout A' at the upper edge thereof or at a suitable distance above the bottom of the vessel. The vessel is preferably provided with a cap or partial cover $A^2$ adjacent to the spout, but which leaves the spout free. A bead or rim $a$ below the level of the spout A' serves as a support for the strainer B, which extends entirely across the vessel A, completely separating the same into an upper and a lower part. B' is an imperforate diaphragm fastened closely upon the upper surface of the strainer B and extending upward therefrom from one edge to the other of said strainer, and adapted also to make a close contact with the inner sides of the vessel A. If now the strainer B is placed upon the bead $a$ and the liquid to be strained is poured upon the strainer on one side of the diaphragm B', the liquid passes into the lower part of the vessel A, and if the strainer is tipped the liquid will flow in an upward direction and will again pass through the strainer on the other side of the diaphragm B' and thence out through the spout. I thus obtain a double straining of the liquid, and as the strainer B and the attached diaphragm B' are easily removable from the vessel A the whole device is arranged to be easily cleaned and there need be no difficult corners to retain any deposit and remain unclean.

In order to fasten the strainer B to the vessel A, any suitable means may be employed; but I prefer to make a bead or projection $b'$ across the diaphragm B' and extending forwardly therefrom in such position as to be sprung under the rear edge of the cap $A^2$, the diaphragm being of such contour as to fit closely against said cap. If now the strainer is set in place, a slight bending of the diaphragm B' permits the bead $b'$ to be sprung under the rear edge of the cap $A^2$ and the two parts of the vessel will be held firmly in place. A handle of any suitable form—for example, the wire handle $b$—may be used for removing the strainer from the vessel.

My device may be provided with an ordinary handle C, Fig. 2, or may be provided with suitable means of attaching the same to the spout of a vessel—as, for instance, the clamping device shown in Fig. 1. In this latter case an ear D is attached to the vessel A at a point diametrically opposite the spout A'. Two clamping-arms D', adapted to extend around the spout of a tea or coffee pot, rest one on each side of the ear D and are fastened thereto by a rivet, or preferably by the thumb-bolt $d$, whereby the angle of the arms D' with reference to the vessel A may be adjusted and changed. The two arms D' are pressed together to clamp the spout E between them by means of a thumb-bolt $d'$ at the other end of the arms.

When the tea or coffee pot is restored to the upright position after liquid has been poured therefrom and the strainer has been used, all liquid contained in or cohering to the vessel A will flow back into the lower part of the vessel and is there retained, and hence cannot drip from the vessel.

What I claim is—

1. In a tea or coffee strainer, the combination of a vessel, a strainer passing entirely across the same and dividing the vessel into an upper and a lower portion, and an imperforate diaphragm extending upward from said strainer and separating the upper portion of said vessel into two parts; whereby liquid poured into the vessel on one side of the diaphragm passes through the strainer and into the lower part of the vessel and passes out therefrom through the strainer on the other side of the diaphragm.

2. In a tea or coffee strainer, the combination of a vessel, a strainer passing entirely across the same and dividing the vessel into an upper and a lower portion, and an imperforate diaphragm extending upward from said strainer and separating the upper portion of said vessel into two parts, whereby liquid poured into the vessel on one side of the diaphragm passes through the strainer into the lower part of said vessel and passes out therefrom through the strainer on the other side of the diaphragm, said strainer and diaphragm being removable from said vessel.

3. In a tea or coffee strainer, the combination of a vessel, a strainer passing entirely across the same and dividing the vessel into an upper and a lower portion, an imperforate diaphragm extending upward from said strainer and separating the upper portion of said vessel into two parts, whereby liquid poured into the vessel on one side of the diaphragm passes through the strainer into the lower part of said vessel and passes out therefrom through the strainer on the other side of the diaphragm, said strainer and diaphragm being removable from said vessel, and retaining means for holding the strainer and diaphragm in said vessel.

4. In a tea or coffee strainer, the combination of a vessel, a strainer passing entirely across the same and dividing the vessel into an upper and a lower portion, an imperforate diaphragm extending upward from said strainer and separating the upper portion of said vessel into two parts; whereby liquid poured into the vessel on one side of the diaphragm passes through the strainer and into the lower part of the vessel and passes out therefrom through the strainer on the other side of the diaphragm, and angularly-adjustable clamping means for attaching the vessel to the spout of a tea or coffee pot.

ALBERT R. PRITCHARD.

Witnesses:
   E. H. MARSELLUS,
   JOHN P. BOWMAN.